United States Patent [19]

Erickson

[11] 4,388,012
[45] Jun. 14, 1983

[54] SWIVEL CONNECTOR
[75] Inventor: David A. Erickson, Hinsdale, Ill.
[73] Assignee: Illinois Tool Works Inc., Chicago, Ill.
[21] Appl. No.: 171,503
[22] Filed: Jul. 23, 1980
[51] Int. Cl.[3] .......................... F16B 3/00; F16C 11/00; F16D 1/12
[52] U.S. Cl. .................................... 403/142; 403/165; 403/301; 403/313; 403/406; 280/511; D12/162
[58] Field of Search ............... 403/141, 142, 164, 165, 403/301, 302, 313, 344, 361, 405, 406; 280/511, 513; D12/162

[56] References Cited
U.S. PATENT DOCUMENTS

| | | | |
|---|---|---|---|
| 1,732,888 | 10/1929 | Harris et al. | 403/141 |
| 2,314,870 | 3/1943 | Dayton | 280/513 |
| 3,552,775 | 1/1971 | Warner | 403/164 X |
| 4,037,978 | 7/1977 | Connelly | 403/164 |
| 4,118,131 | 10/1978 | Schnitzius | 403/141 X |
| 4,225,261 | 9/1980 | Marx | 280/513 X |
| 4,311,405 | 1/1982 | Hawley | 403/142 |

Primary Examiner—Wayne L. Shedd
Attorney, Agent, or Firm—Jerold M. Forsberg; Thomas W. Buckman

[57] ABSTRACT

There is disclosed a new and improved swivel connector assembly for connecting a member to be pivoted to a pivot. The assembly includes just two components which may be readily assembled, a socketed assembly and a retaining sleeve. The socketed assembly has a forward portion including a socket forming a bearing seat and a rearward portion having a cylindrically shaped socket. A slot which extends from a point forward of the bearing seat center to and through the rearward portion to form bifurcated opposed socketed portions which may be separated to enlarge the bearing seat and cylindrically shaped socket to permit ready assembly of the same to a pivot ball and a member to be pivoted. The sleeve is arranged to be axially slid over the socketed rearward portion to thereby maintain the assembly in assembled relation.

9 Claims, 3 Drawing Figures

SWIVEL CONNECTOR

BACKGROUND OF THE INVENTION

The present invention is generally directed to a new and improved swivel connector and more particularly to a swivel connector assembly for establishing an interconnection between a member to be pivoted and a pivot with little effort.

There are many situations where a member must be mounted for pivotal movement. In such situations, connectors are often utilized for enabling pivotal movement of the member by interconnecting the member to a pivot, such as a pivot ball.

Connectors for these applications generally include a bearing seat or circular recess which receives and confines the pivot ball while allowing relative pivotal movement therebetween, and means for capturing and supporting the member to be pivoted. As a result, the member is rendered free to pivot about the pivot ball.

Connectors of this variety find considerable use in manufacturing applications. It is necessary for these types of connectors to allow the required pivot connection to be established in a close and cramped environment with little effort by an operator to minimize assembly time and manufacturing cost. However, the connector must also provide a joint connection of extreme integrity to assure that the joint will be reliable and not fail during operation.

From the foregoing, it can be appreciated that a swivel connector must be adapted for assembly to the pivot and to the member with little force. However, the connector must require a high force to cause the connection to come apart.

It is therefore an object of the present invention to provide a new and improved swivel connector.

It is a further object of the present invention to provide a swivel connector which may be easily assembled to a pivot and to a member to be pivoted while thereafter maintaining a reliable joint connection.

It is a more specific object of the present invention to provide a swivel connector which may be expanded to receive a pivot and an end of a member to be pivoted and then closed and secured to maintain a reliable swivel connection.

SUMMARY OF THE INVENTION

The invention therefore provides a swivel connector assembly for connecting a member to be pivoted to a pivot. The assembly includes socketed means having a forward portion including a generally spherical bearing seat for confining a ball pivot therein and a generally cylindrical rearward portion having a generally cylindrical inner socket for receiving one end of a member to be pivoted, the one end including an annular groove defining a head. The cylindrical socket includes a lug means for lockingly engaging the annular groove. The socket means further includes a slot extending from a point forward of the center of the bearing seat and rearwardly through the rearward portion to form a pair of opposed bifurcated socketed portions joined by a joining portion to permit the opposed portions to be radially separated about the joining portion to enlarge the bearing seat and the cylindrical socket for insertion of the pivot ball and the head of the member end respectively therein. The assembly further includes a hollow generally cylindrical sleeve member arranged to be axially slid over the socketed means rearward portion. The sleeve member has an inner diameter substantially equal in dimension to the outer dimension of the socketed means rearward portion and when disposed over the rearward portion of the socketed means will lockingly confine the bearing seat and clamp head end of the member within the cylindrical socket. The socketed means rearward portion includes retention means for axially confining the sleeve when disposed thereover.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DESCRIPTION OF THE PREFERRED EMBODIMENT

Figure 1:
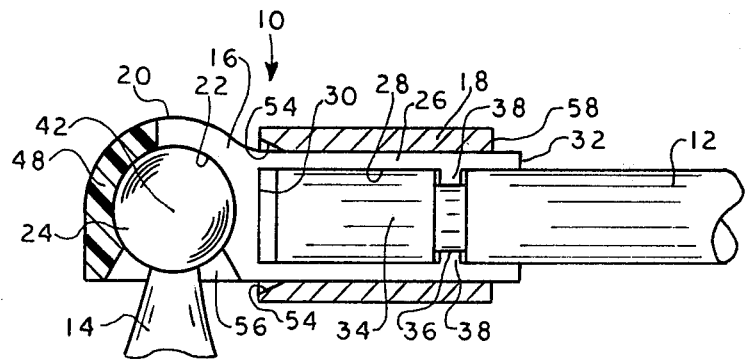
FIG. 1 is a cross-sectional side view of a swivel connector assembly embodying the present invention illustrated in assembled relation to a pivot ball and one end of a member to be pivoted.

Referring now to FIG. 1, a swivel connector 10 is there illustrated in a fully assembled condition for interconnecting and establishing a reliable swivel joint connection between a member 12 to be pivoted and a pivot 14. The connector 10 generally includes a socketed means body 16 and a sleeve 18 adapted to be received over a portion of the socketed body 16.

The socketed body includes a forward portion 20 having a spherical recess or bearing seat 22 therein. The bearing seat 22 is adapted to receive and confine a correspondingly shaped ball pivot 24 of pivot 14.

The socketed body 16 further includes a rearward portion 26 which is generally cylindrical in configuration. Within the rearward portion 26 of the socketed body 16 there is a generally cylindrical socket configuration 28 which extends from a forward wall 30 adjacent the forward portion 20 to the rearward end 32 of the socketed body 16. The cylindrical socket is defined at the rearward end 32 by inwardly extending lugs 38.

It may be noted in FIG. 1 that the member 12 has one end 34 which is arranged to be received within the cylindrical socket 28. The member 12 includes an annular groove or recess 36 defining a head end. The lugs 38 may comprise an annular ring formation within the cylindrical socket 28 or one or more discrete ribs or the like projecting into the aperture from the inner surface of the cylindrical socket. The lug means 38 disposed so that they will lockingly engage the annular groove 36 of the member 12 and thereby restrain the member 12 against axial movement relative to the socketed body.

Figure 2:
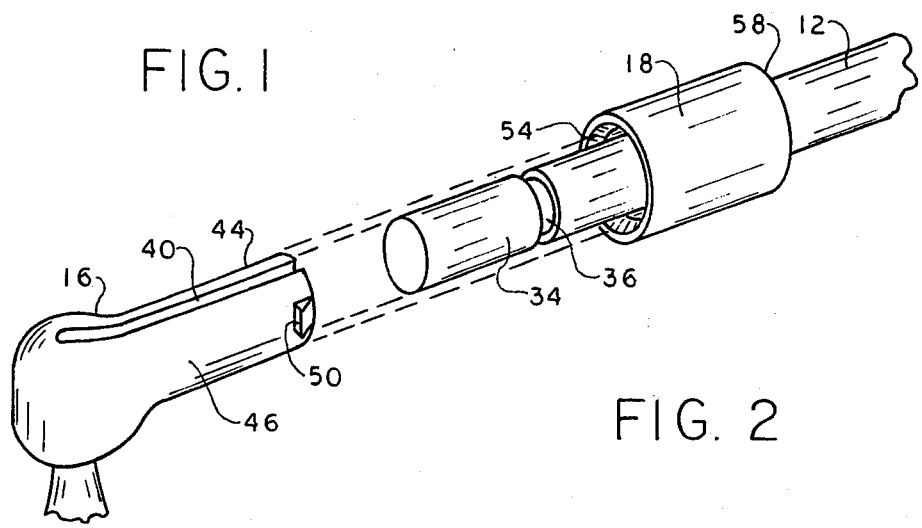
FIG. 2 is an exploded perspective view of the assembly of FIG. 1.

As may be noted in FIG. 2, the socketed body 16 further includes a slot means in the form of a slot 40 which extends through the socket 16 along the longitudinal axis thereof from a point forward of the center 42 of the bearing seat 22, completely through the cylindrical socket 28 and rearward portion 26, and to the rearward end 32 of the socketed body 16. As a result, the slot 40 forms a pair of opposed bifurcated socketed portions 44 and 46.

The socketed body 16 and sleeve 18 are preferably formed from a plastic material to thereby render the socketed body and sleeve deformable. By virtue of the slot 40 as above described, the opposed socket portions 44 and 46 are radially separable about adjoining portion 48 to enable enlargement of the bearing seat 20 and the cylindrical socket 28 to allow the ball pivot 24 to be received within the bearing seat 22 and the member end 34 within the cylindrical socket 28.

The sleeve 18 is also generally cylindrical in configuration and is hollowed out along its axial length to define an inner diameter dimension. As will be noted in FIG. 1, the inner diameter dimension of the sleeve 18 is substantially equal in dimension to the combined outer dimensions of the socketed body rearward portion 26 and the member end 34 when the same are in assembled relation. The sleeve 18 is arranged to be received over the rearward portion 26 of the socketed body 16, and when so received maintains the assembled relation of the assembly. More particularly, when the sleeve 18 is axially slid over the rearward portion 26 of the socketed body 16, the ball pivot 24 is confined within the bearing seat 22 and the member end 34 of member 12 is securely confined within the cylindrical socket 28.

Figure 3:
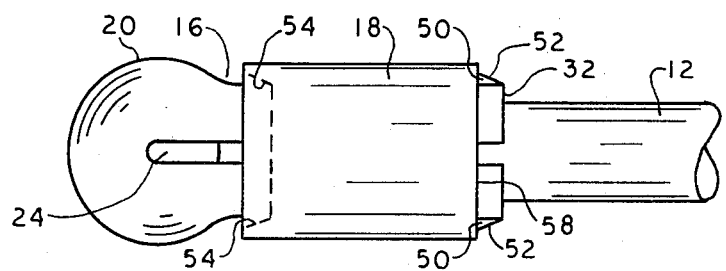
FIG. 3 is a top plan view of the assembly of FIG. 1.

Referring now to FIG. 3, it can there be noted that when the sleeve 18 is received over the socketed body 16, the sleeve 18 is restrained from axial movement thereon by a retention means which may take the form of a pair of lugs 50. The lugs 50 are at the rearward end 32 of the socketed body 16 and project radially outwardly therefrom. The lugs 50 have a tapered guide surface 52 forming an acute angle with the socketed body in a forward direction from the rearward end 32. These guide surfaces guide the axial movement of the sleeve 18 over the lugs and the end of the socketed body.

In order to assure smooth operation during the assembly of the connector assembly of the present invention, the sleeve 18 further includes a tapered or chamfered leading surface 54 at its front end. The tapered surface 54 is substantially parallel to the guide surfaces 52 of the lugs 50. As a result, the sleeve 18 will be smoothly guided over the lugs 50 upon its axial displacement to its retained position over the rearward portion 26 of the socketed body 16. The fully assembled condition is illustrated in FIGS. 1 and 3.

From the foregoing, it can be seen that the swivel connector of the present invention is easily assembled to a pivot and a member to be pivoted for establishing a reliable pivotal connection therebetween. In assembling the swivel connector of the present invention, the opposed socketed portions 44 and 46 are radially spread apart about the adjoining portion 48 to enlarge the bearing seat 22 and the cylindrical socket 28. The ball pivot 24 is then inserted through the tapered opening 56 and into the enlarged bearing seat 22. Sleeve 18 is slid unto the member 12 and the opposed socketed portions 44 and 46 are radially separated about the adjoining portion 48 to enlarge the cylindrical socket 28. The end 34 of the member 12 may be readily received by the cylindrical socket 28 with the lugs 38 lockingly engaging the annular groove 36 of the member 12. When both the ball pivot 24 and the end 34 of member 12 are seated in their respective socket areas, the sleeve 18 in slid axially over the rearward portion 26 of the socketed body 16 with the tapered surface 54 of the sleeve first engaging the guide surfaces 52 of the lugs 50. Axial displacement of the sleeve 18 toward the forward portion 20 of the socketed body 16 is continued until the rearward edge 58 of the sleeve 18 clears the lugs 52. When this occurs, the lugs 52 will snap into their positions as shown in FIG. 3 and the sleeve 18 will be restrained from axial movement upon the socketed body 16.

By virtue of the inner diameter of the sleeve 18 being substantially equal in dimension to the outer dimension of the rearward portion 26 of the socketed body 16 when in the assembled condition as shown in FIGS. 1 and 3, the member 12 will be securely confined within the cylindrical socket 28 and the ball pivot 24 will likewise be confined within the bearing seat 22 but allowed to pivotally move therein. As a result, assembly of the connector is completed with little effort and in a very short period of time.

While a particular embodiment of the present invention has been shown and described, modifications may be made, and it is therefore intended to cover in the appended claims all such changes and modifications which fall within the true spirit and scope of the invention.

I claim:

1. A swivel connector assembly pivotally connecting an elongated member having a head defined at one end to a substantially spherical pivot comprising: a deformable connector body having a first socket which releasably receives said defined head and a second socket having a bearing seat which confines said pivot, slot means in said body intersecting said first socket and a portion of said second socket permitting expansion of said first and second sockets enabling insertion and removal of said head portion from said first socket and said pivot from said second socket, and sleeve means axially received over one end of said body precluding expansion of said first and second sockets, whereby when said pivot is positioned in said second socket, said head is positioned within said first socket, and said sleeve is received over said one end of said body a swivel connector assembly is formed which precludes disassociation of the pivot and elongated member.

2. An assembly as defined in claim 12, wherein said body includes a forward end including said first socket and a rearward end including said second socket, said second socket extending axially from adjacent said first socket to the distal end of said rearward end, said slot means comprises a slot extending through said first socket along the longitudinal axis thereof and through a portion of said second socket to a point between the center of said second socket and the forward end of the body thereby forming opposed bifurcated portions unitarily joined by an integral hinge joining portion.

3. An assembly as defined in claim 2, wherein said sleeve means has an inner dimension substantially corresponding to the outer dimensions of said rearward end of said body when said head is disposed within said first socket.

4. An assembly as defined in claim 3, wherein said first socket is generally cylindrical in shape and the member to be pivoted is generally cylindrical in shape, said sleeve means comprises a hollow cylindrical member the inner diameter of which is substantially equal in dimension to the outer diameter of said rearward end when said head of said member is received and confined within the first socket.

5. An assembly as defined in claim 4, wherein said head is defined by an annular groove spaced from said one end and wherein said first socket includes lug means for lockingly engaging said annular groove.

6. An assembly as defined in claim 5, wherein said rearward end of said body includes retention means for axially confining said sleeve means upon said rearward end.

7. An assembly as defined in claim 6, wherein said retention means comprises at least one lug projecting radially outwardly from said rearward end, said at least one lug having a tapered guide surface forming an acute angle with said body in a forward direction from said rearward end for guiding the axial movement of said sleeve means over said rearward end.

8. An assembly as defined in claim 7, wherein said sleeve means includes a front end having a leading tapered surface which is substantially parallel to said guide surface.

9. A swivel connector assembly for connecting a member to be pivoted to a substantially spherical pivot comprising: deformable socketed means having a forward portion including a generally spherical bearing seat for confining said substantially spherical pivot therein and a generally cylindrical rearward portion having a generally cylindrical socket therein for receiving one end of said member to be pivoted, said member including an annular groove spaced from said one end defining a head portion, said generally cylindrical socket including lug means which lockingly engages with said annular groove when said head portion of said member is disposed within said generally cylindrical socket, said socketed means further including a slot extending from a point within and forward of the center of said bearing seat rearwardly through said rearward portion thereby forming opposed bifurcated portions, said portions being separable to permit expansion of said bearing seat and said cylindrical socket for insertion of said substantially spherical pivot and said head portion, respectively, therein; and a hollow generally cylindrical sleeve member arranged to be axially slid over said rearward portion of said socketed means said sleeve member having an inner diameter substantially equal in dimension to the outer diameter of said rearward portion of said socketed means when said head portion is received therein, retention means for axially confining said sleeve on said rearward portion, whereby said pivot can be confined within said bearing seat and said head portion can be clamped within said cylindrical socket when said sleeve member is slid over said rearward portion.

* * * * *